United States Patent
Kumar et al.

(10) Patent No.: US 12,189,545 B2
(45) Date of Patent: Jan. 7, 2025

(54) SYSTEM, APPARATUS AND METHODS FOR HANDLING CONSISTENT MEMORY TRANSACTIONS ACCORDING TO A CXL PROTOCOL

(71) Applicant: Intel Corporation, Santa Clara, CA (US)

(72) Inventors: Karthik Kumar, Chandler, AZ (US); Francesc Guim Bernat, Barcelona (ES)

(73) Assignee: Intel Corporation, Santa Clara, CA (US)

(*) Notice: Subject to any disclaimer, the term of this patent is extended or adjusted under 35 U.S.C. 154(b) by 623 days.

(21) Appl. No.: 17/443,379

(22) Filed: Jul. 26, 2021

(65) Prior Publication Data

US 2021/0349840 A1    Nov. 11, 2021

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/4022* (2013.01); *G06F 13/4068* (2013.01); *G06F 13/4221* (2013.01)

(58) Field of Classification Search
CPC ............ G06F 13/1668; G06F 13/4022; G06F 13/4068; G06F 13/4221
See application file for complete search history.

(56) References Cited

U.S. PATENT DOCUMENTS

| | | | |
|---|---|---|---|
| 8,843,772 B2 | 9/2014 | Hormuth | |
| 9,477,279 B1 | 10/2016 | Piszczek et al. | |
| 11,416,056 B2 | 8/2022 | Knoth et al. | |
| 2013/0318371 A1 | 11/2013 | Hormuth | |
| 2020/0133367 A1 | 4/2020 | Wang et al. | |
| 2020/0192798 A1 | 6/2020 | Natu | |
| 2020/0285420 A1* | 9/2020 | Guim Bernat | G06F 3/0659 |
| 2020/0409441 A1 | 12/2020 | Hatch et al. | |

(Continued)

FOREIGN PATENT DOCUMENTS

| | | |
|---|---|---|
| CN | 113129205 A | 7/2021 |
| WO | 2016014044 A1 | 1/2016 |

OTHER PUBLICATIONS

European Patent Office, Office Action dated Sep. 22, 2022 in European Patent Application No. 22165696.0 (11 pages).

(Continued)

*Primary Examiner* — Edward J Dudek, Jr.
(74) *Attorney, Agent, or Firm* — Essential Patents Group, LLP; Christopher K. Gagne

(57) ABSTRACT

In one embodiment, an apparatus includes: an interface to couple a plurality of devices of a system and enable communication according to a Compute Express Link (CXL) protocol. The interface may receive a consistent memory request having a type indicator to indicate a type of consistency to be applied to the consistent memory request. A request scheduler coupled to the interface may receive the consistent memory request and schedule it for execution according to the type of consistency, based at least in part on a priority of the consistent memory request and one or more pending consistent memory requests. Other embodiments are described and claimed.

20 Claims, 8 Drawing Sheets

(56) References Cited

U.S. PATENT DOCUMENTS

| | | | |
|---|---|---|---|
| 2021/0011864 A1* | 1/2021 | Guim Bernat | G06F 12/0833 |
| 2021/0200545 A1 | 7/2021 | Marolia et al. | |
| 2021/0349512 A1 | 11/2021 | Guim Bernat et al. | |
| 2021/0374056 A1* | 12/2021 | Malladi | G06F 12/0891 |
| 2022/0358042 A1* | 11/2022 | Malladi | G06F 12/0828 |

OTHER PUBLICATIONS

European Patent Office, Response to the Communication under Rules 69 and 70a(1) EPC dated Jul. 28, 2023 in European Patent Application No. 22165696.0 (60 pages).
United States Patent Office, Non-Final Office Action dated Aug. 29, 2024 in U.S. Appl. No. 17/443,374 (36 pages).
European Patent Office, Office Action dated Aug. 5, 2022 in European Patent Application No. 22159326.2 (10 pages).
U.S. Appl. No. 17/032,056, filed Sep. 25, 2020, entitled "System, Apparatus and Method for Dynamically Providing Coherent Memory Domains," by Francesc Guim Bernat et al.
Intel Corporation, "Compute Express Link, Specification, Mar. 2019, Revision 1.0," Mar. 2019, 206 pages.
Intel Corporation, Compute Express Link™ 2.0 White Paper, Dec. 2020, 4 pages.

* cited by examiner

200

| Consistent Request (214) | Priority (216) | Consistency Type (218) | Request (219) |
|---|---|---|---|
| ID | Priority | Type | Req |
| 0x343 | Medium | Eventual | Values List} |
| ... | ... | ... | ... |

210, 212$_0$, 212$_n$

| ID (224) | Arrival Time (226) | Request (228) |
|---|---|---|
| ID | 6453 | Req |
| 0x343 | 8732 | @A, VAL ..} |
| | ... | ... |

SYSTEM, APPARATUS AND METHODS FOR HANDLING CONSISTENT MEMORY TRANSACTIONS ACCORDING TO A CXL PROTOCOL

BACKGROUND

In recent years, there has been an explosion in database architectures with different types of data stores, including not structured query language (NoSQL) databases, graph databases, etc., to handle the growth in types and amounts of data. With both real-time processing and memory requirements, applications are commonly scaled out to multiple nodes. In a single node having coherence, there is the concept of strong consistency, meaning updates or writes to data fields are visible to all cores/threads on the node. There is no similar coherency across a set of nodes, and thus application-level semantics are required to guarantee different types of consistency.

But maintaining full consistency with application software across a cluster having multiple compute nodes becomes challenging, especially in the presence of a high load. Consider a NoSQL store with multiple writers and readers: every write would hold up all reads across the entire cluster to ensure that the write has propagated through and no entity reads a stale copy of the data. With many, many concurrent writes and reads across several nodes in a cluster, this approach simply does not scale.

BRIEF DESCRIPTION OF THE DRAWINGS

FIG. 2 is a block diagram of a storage in accordance with an embodiment.

DETAILED DESCRIPTION

Figure 1:
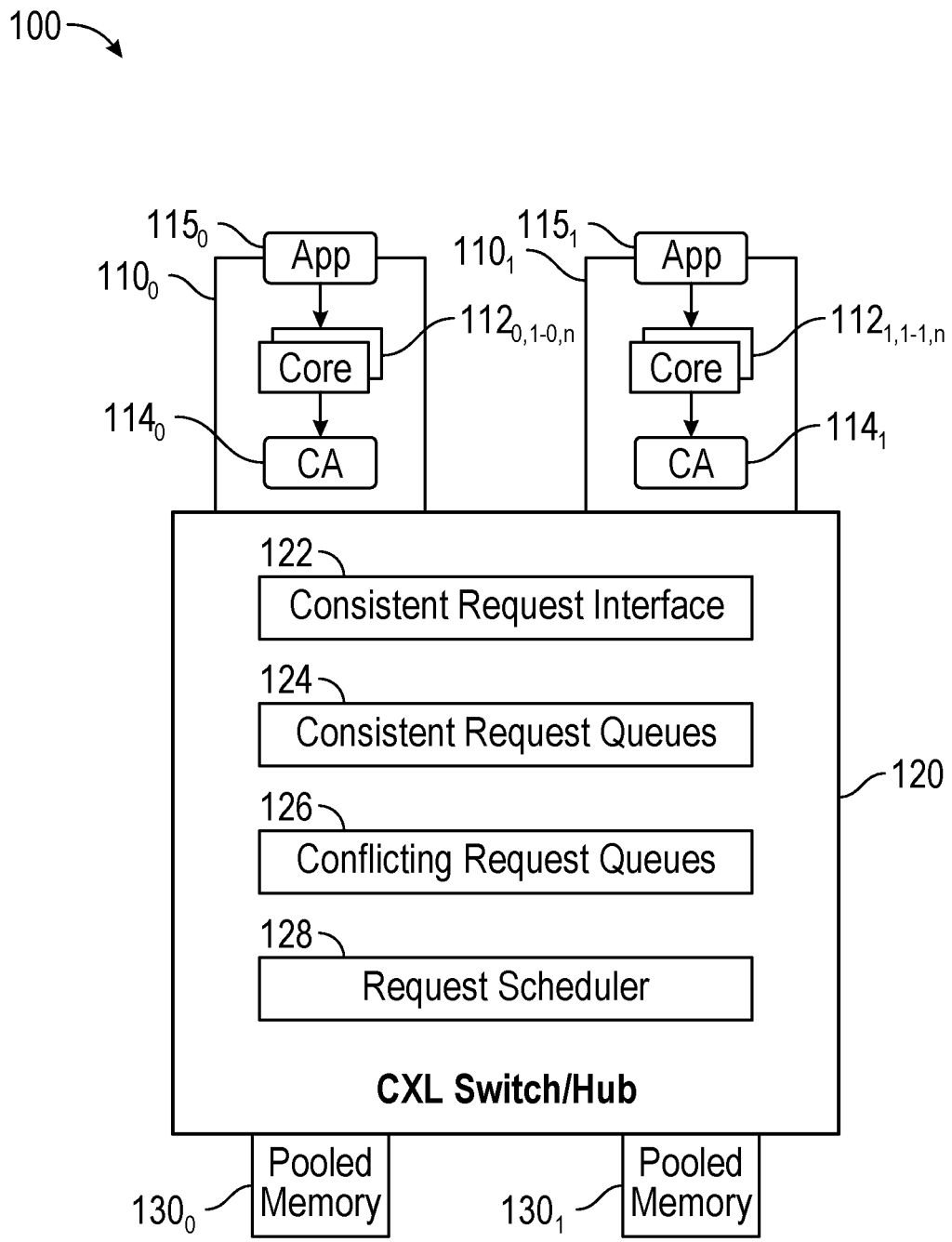
FIG. 1 is a block diagram of a system in accordance with an embodiment.

In various embodiments, a computing system having Compute Express Link (CXL) interconnects in accordance with a given CXL specification such as the CXL Specification version 2.0 (published 2020), any future update, version (e.g., version 3.0) or variation thereof, may enable memory transactions to be specified at an application level with an indication of a desired level of consistency for the memory transaction.

In one embodiment, CXL-connected devices such as central processing units (CPUs), accelerators or so forth can issue consistent memory (e.g., read and write) transactions according to an instruction set architecture (ISA). In an embodiment, a consistent memory transaction of an ISA may specify a list of addresses that are mapped into the consistent update/read; a list of values that are mapped into the consistent update (whenever a consistent update happens); and the type of consistent operation. There may be different types or flavors of instructions available in an ISA to effect consistent memory transactions, at least some of which may be communicated between CXL-connected devices via a CXL.memory protocol. In some cases, a caching agent (CA) of a CPU may receive, from an application, a request for a type of consistent update for a set of memory lines. The caching agent in turn is responsible to ensure that lines in local cache memories (and potentially remote cache memories) are invalidated, and generate a consistent write back via a CXL interconnect (for a write transaction).

In a CXL architecture, devices may communicate different information via different CXL protocols. Per a basic CXL protocol architecture, there are currently multiple specific communication protocols (including CXL.memory, CXL.cache memory and CXL.io) available via which particular information types may be communicated. In embodiments, devices may be provided with consistency hardware capabilities such that an application may issue consistent memory transactions (equally referred to herein as "consistent memory requests") that can be handled by devices according to the CXL.memory protocol.

With embodiments, memory semantics may be provided to a scale-out cluster having multiple and potentially remote platforms. In this way, applications can be written to get the best of both worlds, by scaling out to multiple nodes and still retaining memory semantics.

In a representative embodiment, there may be six consistency levels, as illustrated in Table 1, which shows exemplary consistency levels according to one embodiment.

TABLE 1

| | |
|---|---|
| Strong Consistency | See all previous writes. |
| Eventual Consistency | See subset of previous writes. |
| Consistent Prefix | See initial sequence of writes. |
| Bounded Staleness | See all "old" writes. |
| Monotonic Reads | See increasing subset of writes. |
| Read My Writes | See all writes performed by reader. |

To further describe a few of these consistency guarantees, consider the following. Strong consistency ensures that a read operation returns a value that was last written for a given object, meaning synchronous replication is used, which does not scale in the presence of a load. A consistent prefix ensures that a reader is guaranteed to observe an ordered sequence of writes starting with the first write to a data object, or a consistent version of the data store that existed at a master at some time in the past. A bounded staleness ensures that read results are not too stale. That is, a read operation is guaranteed to see at least all writes that completed at a given time (or number of updates) before the read started. Monotonic reads (sometimes also called a session guarantee) is a property that applies to a sequence of read operations that are performed by a given client. It states that if the client issues a read operation and then later issues another read operation to the same object(s), the second read operation returns the same value(s) or the results of later writes. Embodiments may enable at least some of these consistency guarantees to be used in a CXL.memory protocol.

Note that while the CXL.cache protocol offers full coherence (and may be the equivalent of "strong consistency"), it does not scale across a cluster of nodes without significant performance overheads. With embodiments, the CXL.memory protocol may be extended with hardware and architectural features to provide memory semantics and consistency, e.g., by providing at least certain ones of the consistency guarantees of Table 1. In this way, application software can avoid use of consistency protocols while achieving performance advantages of memory semantics combined with scale out.

In an embodiment, a CXL interconnect exposes an interface that allows cache circuitry to perform consistent write backs. A consistent update may be associated with a priority and type of consistency (e.g., strong versus eventual). Interconnect circuitry may be responsible to determine when the request is to be executed depending on the type. For instance, the interconnect circuitry may schedule other normal reads or writes to proceed before a consistent update request associated with an eventual consistency guarantee for a low priority update. Once a consistent update is selected, the interconnect circuitry is responsible for executing all update operations, blocking any conflicting new request coming from platforms or devices, and sending an acknowledge to the requesting platform when all updates are confirmed.

Referring now to FIG. 1, shown is a block diagram of a system in accordance with an embodiment. As shown in FIG. 1, a computing system 100 may be any type of system that provides interconnection of at least some components by links via which CXL-based communications may occur. In the embodiment of FIG. 1, a multi-platform system is illustrated having multiple platforms $110_{0,1}$. While only two platforms are illustrated, understand that greater numbers of such platforms may be present in particular use cases. As an example, platforms 110 themselves may be formed of a given computing system at minimum having at least one CPU, memory, storage and interface circuitry.

Still with reference to FIG. 1, platforms 110 couple to a CXL switch or hub 120. As used herein, the terms "hub" and "switch" are used interchangeably to refer to interface circuitry that enables routing of communications between devices, and particularly herein, routing of CXL-based communications. For ease of discussion going forward, such devices will be primarily referred to herein as "hubs." To enable consistent memory transactions in such a system, CXL hub 120 may be configured to receive and handle these transactions with an appropriate level of consistency per the request.

Still with reference to FIG. 1, hub 120 couples to various devices. In the embodiment shown, these devices include pooled memory $130_{0,1}$. Of course, additional devices such as accelerators, graphics processing units (GPUs) or so forth may be present. Pooled memories $130_{0,1}$ may include corresponding dual inline memory modules (DIMMs) or memory drives, which may be the targets of at least certain memory requests, including consistent memory transactions as described herein. In other cases, hub 120 may direct a request to a more remote target (not shown for ease of illustration in FIG. 1).

As illustrated, platform $110_0$ include a plurality of cores $112_{0,1-0,n}$ that communicate with a caching agent (CA) $114_0$. Understand that caching agent $114_0$ may be a hardware circuit responsible for cache coherency operations within platform $110_0$. In an embodiment, CA $114_0$ may be implemented as one or more cache controllers for a cache memory hierarchy. In general, an application $115_0$ may issue memory requests such as read or write requests. In some cases these requests may have an indication of a level of consistency to be applied. Although embodiments are not limited in this regard, an application may provide a hint or other indication of a level of consistency according to one of a number of consistency levels. As one such example, an application may write to a register to specify which of among a menu of available consistency operations it seeks to use.

Still with reference to FIG. 1, application $115_0$ issues memory requests, which are directed to caching agent $114_0$. Assuming caching agent $114_0$ cannot itself handle a request, it directs it to hub 120. In embodiments herein, hub 120 may be configured to receive incoming memory transactions, which in some cases may take the form of CXL.memory transactions. Furthermore, when a request is a consistent memory request according to the CXL.memory protocol, hub 120 may handle the request with an appropriate level of consistency. Understand that similar components may be present in platform 1101.

As illustrated, hub 120 includes various components to handle consistent memory transactions according to a CXL.memory protocol as described herein. Here hub 120 includes a consistent request interface 122 to receive incoming consistent requests from various entities. A request scheduler 128 may be configured to determine when to schedule the consistent memory requests, e.g., with respect to other pending requests. In embodiments, request scheduler 128 may be implemented as a hardware circuit, e.g., as a microcontroller or other programmable processing circuit to perform scheduling of memory requests including consistent memory transactions according to a CXL.memory protocol. Of course request scheduler 128 may be configured to schedule all memory requests whether they are consistent memory requests or regular memory requests, including to inline parse normal transactions coming from any platform and identify if a conflict occurs with any request being scheduled.

As further illustrated in FIG. 1, hub 120 also includes a consistent request queue 124. Queue 124 may be a given storage having entries to store information associated with consistent memory requests, namely pending consistent transactions. Hub 120 further includes a conflicting request queue 126. Queue 126 may be a given storage having entries to store information associated with normal requests that conflict with one or more consistent transactions that are being executed or are otherwise pending in consistent request queue 124.

In an embodiment, request scheduler 128 may, in response to identification of a conflict between a request being scheduled and another pending request, hold the request in conflict queue 126. When the inflight consistent operation having the conflict is finished, this request is removed from conflict queue 126 and continues its travel. Request scheduler 128 also may schedule for execution consistent requests from platforms 110. Consistent requests may be stored in consistent queue 124 when they arrive or may be executed directly depending on the pending requests and the priority of the current request.

In an embodiment, request scheduler 128 may choose a request to be executed at a given time based at least in part on consistency type and whether there are no other requests conflicting. When a request is selected, various operations are sent to the targets, and acknowledgements or data are waited upon. Once all are received, request scheduler 128 may clear any bit conflict of pending operations, generate an update back to the requester, and release the corresponding entry from consistent request queue 124. Understand while shown at this high level in the embodiment of FIG. 1, many variations and alternatives are possible.

Referring now to FIG. 2, shown is a block diagram of a storage in accordance with an embodiment. As shown in FIG. 2, storage 200 may be implemented within a CXL hub. In the high level of FIG. 2, storage 200 more specifically includes a first storage 210 and a second storage 220. In this embodiment, first storage 210 is configured as a consistent request queue having a plurality of entries $212_{0-n}$, each having multiple fields to store information associated with a particular consistent memory transaction.

As illustrated, each entry 212 includes an identifier field 214 to store an identifier of the consistent request, which may be in the form of a unique identifier. Each entry 212 further includes a priority field 216 to store a priority indication, which may be one of multiple levels, e.g., low, medium and high in one embodiment. A consistency type field 218 may store a type of consistency, such as one of the consistency types shown above in Table 1. Finally, each entry 212 may have a request field 219 to store request information, which may include a requester identifier as well as a list of one or more addresses associated with the request and values to be stored at the indicated addresses (in the case of a write). Of course while shown with this particular example in FIG. 2, a consistent request queue may take different forms in other embodiments.

Still with reference to FIG. 2, second storage 220 is configured as a conflicting request queue having a plurality of entries $222_{0-n}$, each having multiple fields to store information associated with a particular conflicting memory transaction. As illustrated, each entry 222 includes an identifier field 224 to store an identifier of the consistent request with which it conflicts. Each entry 222 further includes an arrival time field 226 to store timestamp information. Each entry 222 also includes a request field 228 to store request information, which may include a requester identifier as well as a list of one or more addresses associated with the request and values to be stored at the indicated addresses (in the case of a write). Of course while shown with this particular example in FIG. 2, a conflicting request queue may take different forms in other embodiments. Understand while shown with two separate storages for purposes of discussion, in a particular embodiment such storages may be implemented as a single memory such as a cache memory included in a CXL hub.

Figure 3:
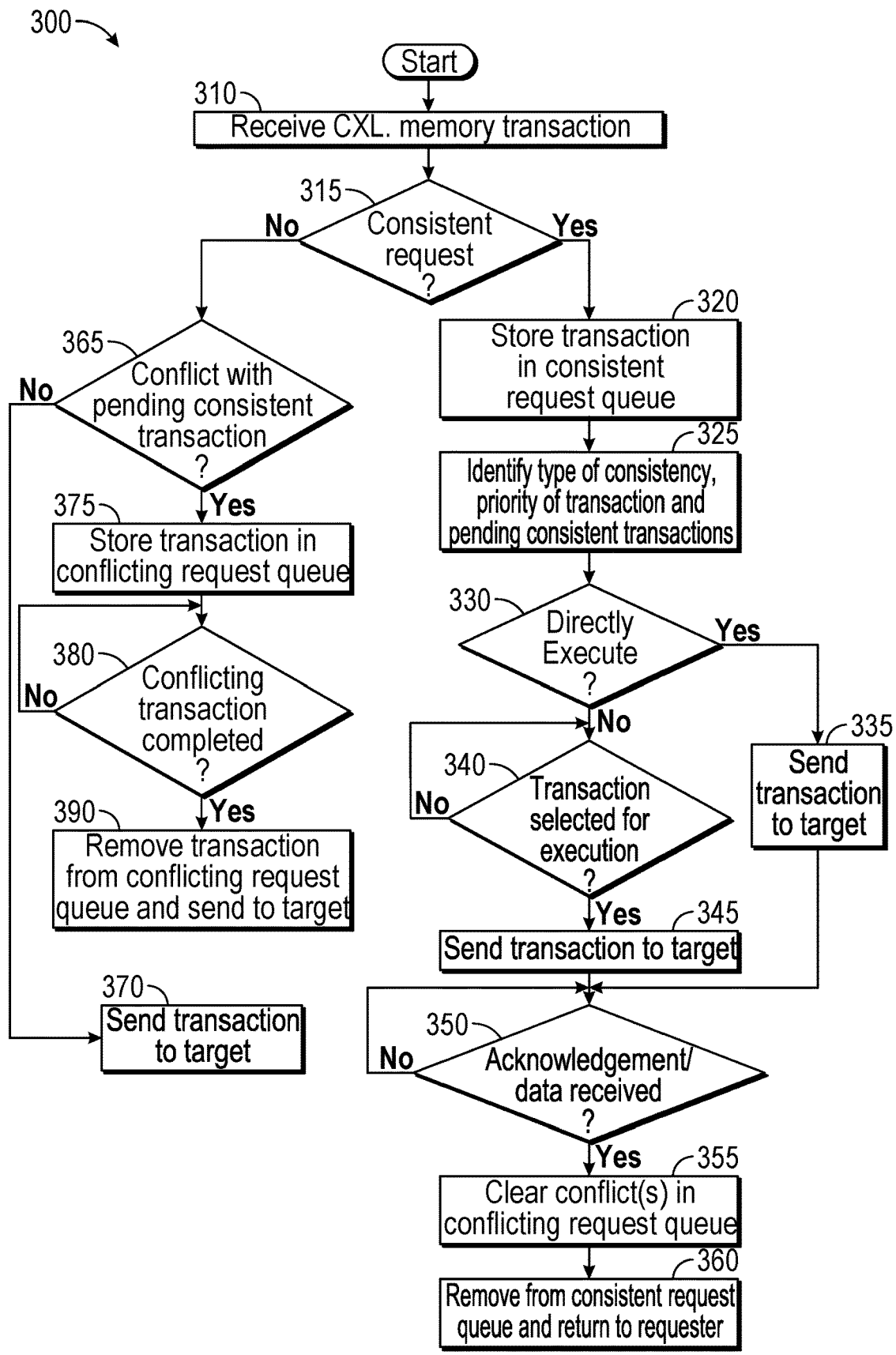
FIG. 3 is a flow diagram of a method in accordance with an embodiment.

Referring now to FIG. 3, shown is a flow diagram of a method in accordance with an embodiment. More specifically method 300 is a method for handling incoming memory requests, namely CXL.memory requests, in a hub. Accordingly, method 300 may be performed by hardware circuitry included in this hub, in combination with firmware and/or software.

As shown, method 300 begins by receiving a CXL.memory transaction (block 310). The hub may determine at diamond 315 whether this request is a consistent memory request. If so, control passes to block 320 where the transaction may be stored in a consistent request queue, and various information of the incoming transaction may be stored in an entry in this queue. Next at block 325 a priority and type of the consistent memory transaction may be identified. Furthermore, an analysis of pending consistent transactions also may be considered. Based on at least this information and possibly additional information, it may be determined at diamond 330 whether the received transaction is to be directly executed by immediately scheduling the transaction for execution. If so, control passes to block 335 where the transaction is scheduled and thus is sent to a target (e.g., a given pooled memory).

Instead if the transaction is not to be directly executed, such as where the consistent memory transaction is of a lower priority and/or a lower level consistency, control passes to diamond 340 to later determine whether the transaction is selected for execution. Once so, at block 345 the transaction is sent to the target. Thereafter at diamond 350 (also reached from block 335), it may be determined whether an acknowledgment (which may or may not include data) is received. If so, any conflicts present in the conflicting request queue may be cleared (block 355). As an example, one or more entries in the conflicting request queue can be indicated to be ready for scheduling given that its conflicting transaction, namely the handled consistent memory transaction, has completed. Control passes next to block 360 where the handled transaction may be removed from the consistent request queue and any data is returned to the requester.

Still with reference to FIG. 3, instead if it is determined that the incoming request is not a consistent request (as determined at diamond 315), control passes to diamond 365 to determine whether the transaction conflicts with one or more pending consistent transactions. If not, the transaction may be scheduled and thus is sent to a target (block 370). While not shown for ease of illustration, understand that following completion of this transaction, additional processing such as receiving a return of data and sending it back to the requester may occur.

Still with reference to FIG. 3, instead if it is determined that there is a conflict with a pending consistent transaction as identified at diamond 365, control passes to block 375 where the request may be stored in the conflicting request queue. When it is determined that the conflicting transaction has completed (as determined at diamond 380), control passes to block 390 where the conflicting transaction may be removed from the conflicting transaction queue and sent to the target for handling, as described above. Understand while shown at this high level in the embodiment of FIG. 3, many variations and alternatives are possible.

In the context of a consistent read transaction, a caching agent may evict all memory lines locally and remotely (e.g., via a remote flush operation) that are included as part of the read. Note that this consistent read may be from memory perspective. Once the eviction happens, the request is sent to the CXL interconnect. When the data is received from the CXL interconnect, it can be stored in a cache memory and an acknowledge message is sent back to the CPU. Note that the acknowledgement may be an asynchronous operation where notification happens via a software interrupt. Also note that a destination of a consistent read transaction may be identified by the transaction (e.g., last level cache (LLC) or level 2 (L2) cache as examples).

In the context of a consistent update (namely a consistent write transaction), a caching agent may invalidate all memory lines locally a remotely that are included as part of the write. Note that data is not needed, given the update with new values. To ensure coherency and consistency, once the invalidations are done, the request is sent to the CXL interconnect, and the acknowledgement from the CXL interconnect that the update has been made effective is generated back to the software stack, e.g., via an asynchronous operation where notification is a software interrupt.

Figure 4:
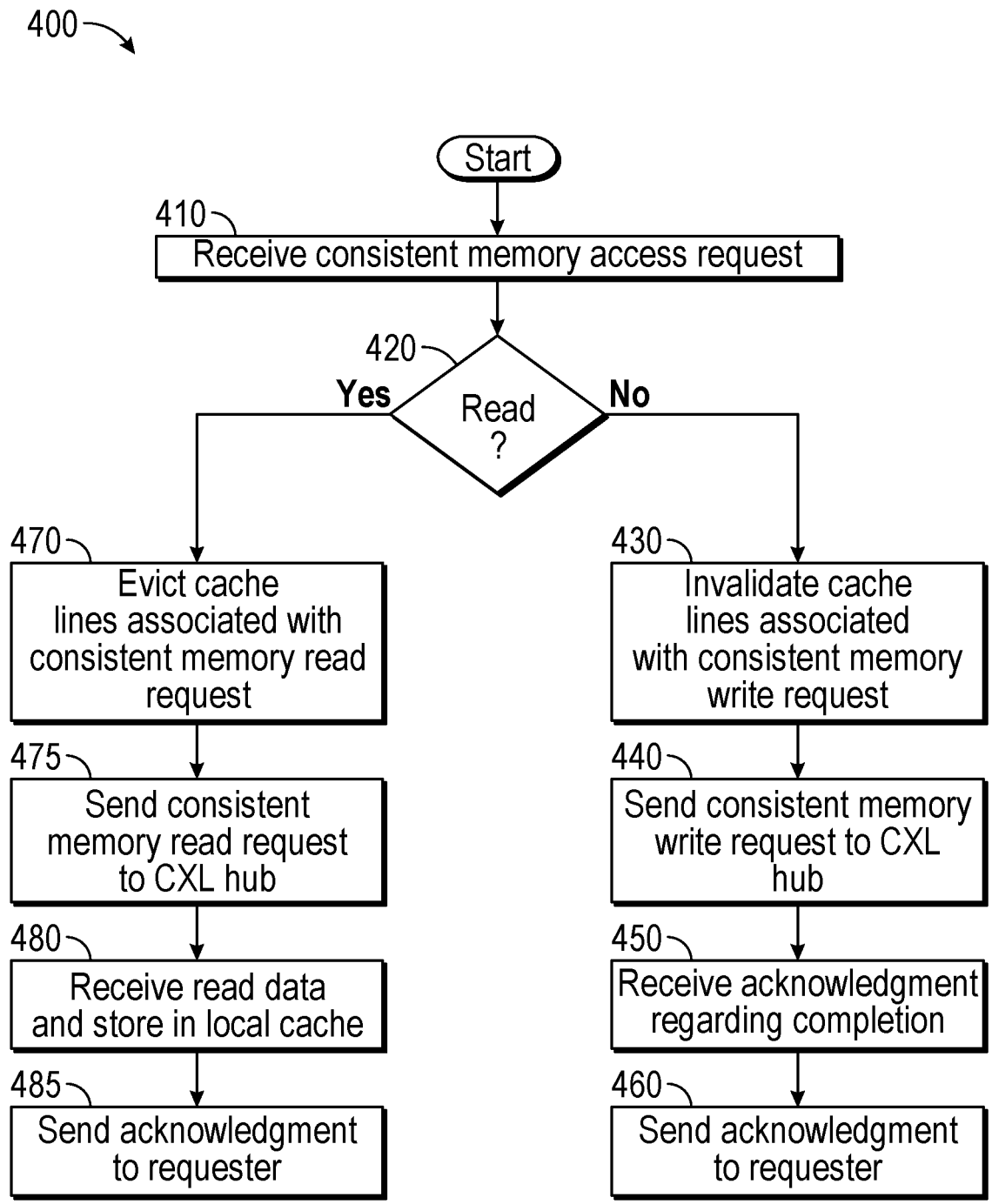
FIG. 4 is a flow diagram of a method in accordance with another embodiment.

Referring now to FIG. 4, shown is a flow diagram of a method in accordance with another embodiment. As shown in FIG. 4, method 400 is a method for handling a consistent memory request received in a caching agent of a platform. Accordingly, method 400 may be performed by hardware circuitry such as one or more cache controllers, in combination with firmware and/or software.

As shown, method 400 begins by receiving a consistent memory access request in the caching agent (block 410). Such request may be received from a core or other processing engine on which an application is executing. Understand that the consistent memory request may be a read or write request. As one example, a consistent memory write transaction may be implemented as an ISA instruction having the general form of STORE_COND <address>, where one of multiple different consistency operations can be performed based on a value written in a predetermined register. In any case, it is determined at diamond 420 whether the request is a read. If the request is a write transaction, control passes to block 430 where one or more cache lines associated with the consistent memory write request may be invalidated. Note that this invalidation may include invalidating any cache lines present in local caches of the CPU/platform. This invalidation may further include invalidating remote cache lines that are present in one or more remote platforms. As such, there may be some amount of latency for this invalidation process to complete, as cache coherency messages are sent to the remote platforms, and responses are received.

In any event, when the invalidation is complete, control next passes to block 440 where the consistent memory write request is sent to a CXL hub. More specifically, the caching agent may translate the received memory request into a consistent memory transaction to be sent via a CXL.memory protocol. In turn, the caching agent may receive an acknowledgement regarding a completion of the transaction (such as an indication that the write data has been successfully written to the target location) (block 450). In response to this acknowledgment, the caching agent may send the acknowledgement to the requester (e.g., a given core) (block 460).

Still referring to FIG. 4, If the request is a read transaction, control passes to block 470 where one or more cache lines associated with the consistent memory write request may be evicted. Note that this eviction may include evicting any cache lines present in local caches of the CPU/platform and/or remote cache lines that are present in one or more remote platforms.

Control next passes to block 475 where the consistent memory read request is sent to a CXL hub, e.g., by translation of the received memory request into a consistent memory transaction to be sent via a CXL.memory protocol. In turn, the caching agent may receive the read data and store it in a local cache (block 480). The caching agent may next send an acknowledgement to indicate receipt of the read data to the requester (e.g., a given core) (block 485). Understand while shown at this high level in the embodiment of FIG. 4, many variations and alternatives are possible.

Embodiments thus provide consistent memory transactions according to a CXL.memory protocol. Such operation may be more efficient than conventional application software-level implementations of consistency/coherency, as these involve software overheads, via network stacks, and cannot use CXL.memory semantics. Embodiments may be implemented in many different systems.

Figure 5:
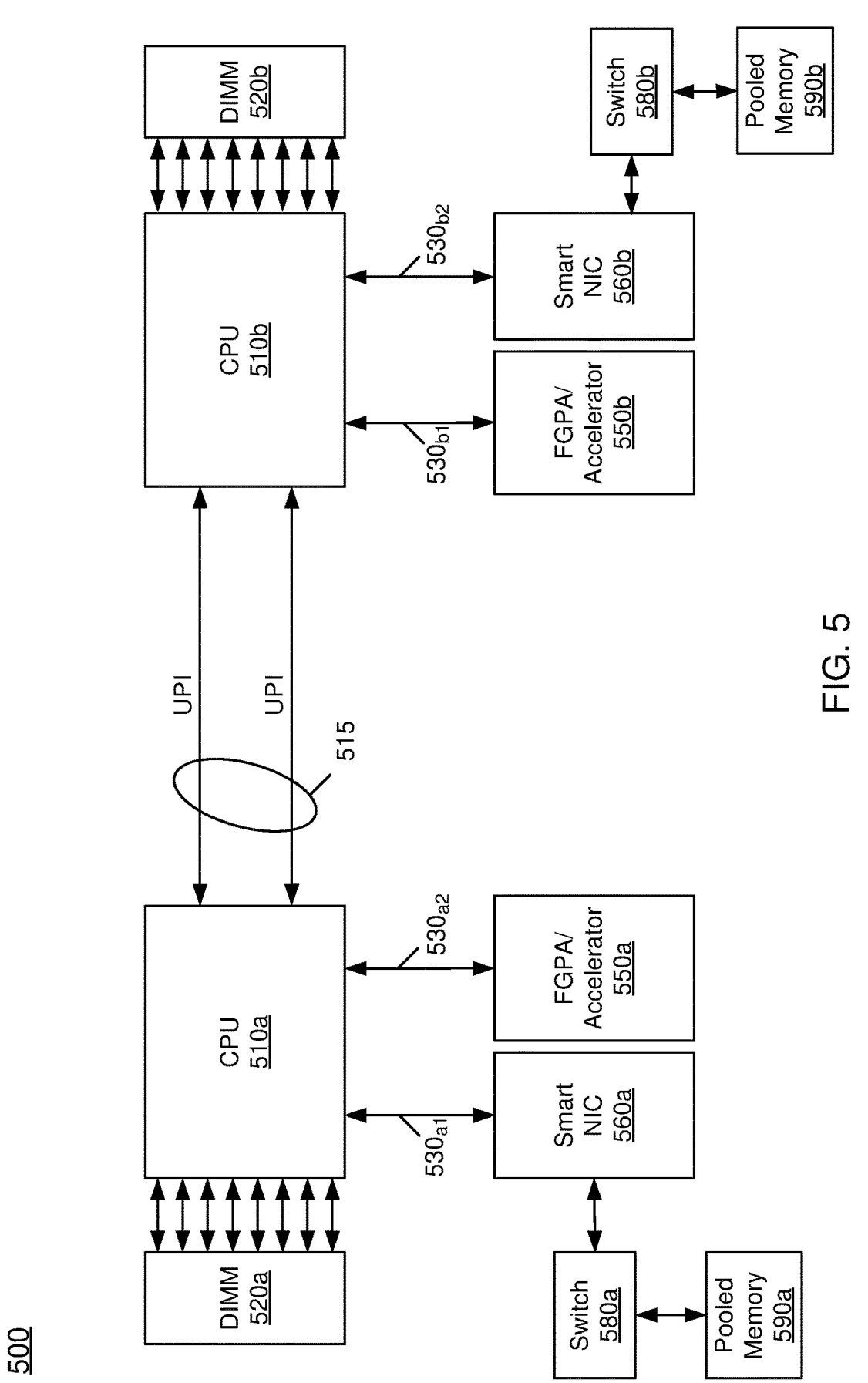
FIG. 5 is a block diagram of a system in accordance with another embodiment.

Referring now to FIG. 5, shown is a block diagram of a system in accordance with another embodiment. As shown in FIG. 5, a system 500 may be any type of computing device, and in one embodiment may be a server system. In the embodiment of FIG. 5, system 500 includes multiple CPUs 510a,b that in turn couple to respective system memories 520a,b which in embodiments may be implemented as DIMMs such as double data rate (DDR) memory, persistent or other types of memory. Note that CPUs 510 may couple together via an interconnect system 515 such as an Intel® Ultra Path Interconnect or other processor interconnect technology.

To enable coherent accelerator devices and/or smart adapter devices to couple to CPUs 510 by way of potentially multiple communication protocols, a plurality of interconnects 530a1-b2 may be present. In an embodiment, each interconnect 530 may be a given instance of a CXL.

In the embodiment shown, respective CPUs 510 couple to corresponding field programmable gate arrays (FPGAs)/accelerator devices 550a,b (which may include GPUs, in one embodiment. In addition CPUs 510 also couple to smart NIC devices 560a,b. In turn, smart NIC devices 560a,b couple to switches 580a,b (e.g., CXL switches in accordance with an embodiment) that in turn couple to a pooled memory 590a,b such as a persistent memory. In embodiments, switches 580 may implement circuitry described herein to perform consistent CXL.memory transactions as described herein. Of course, embodiments are not limited to switches and the techniques described herein may be performed by other entities of a system, including CPUs 510.

Figure 6:
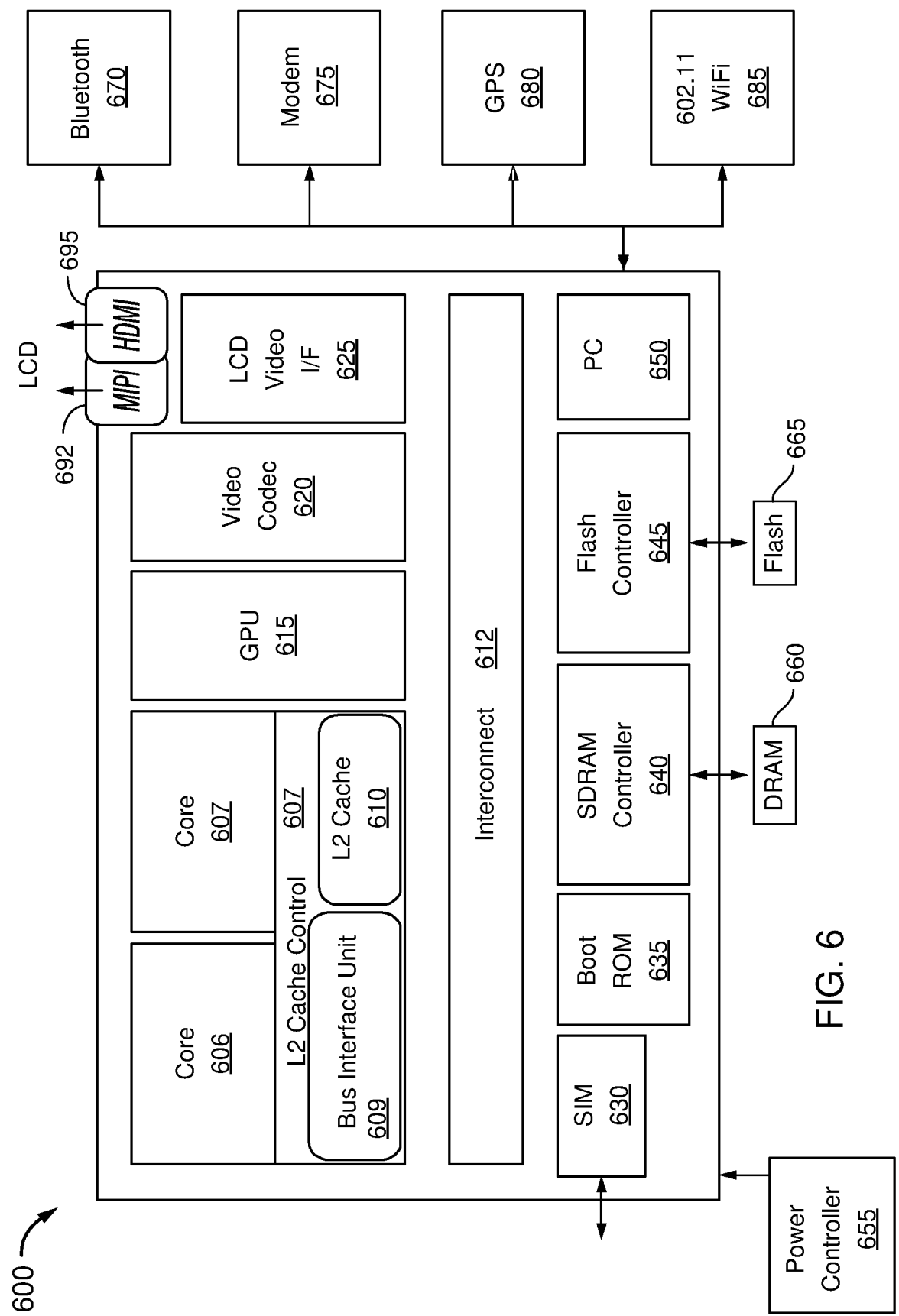
FIG. 6 is a block diagram of an embodiment of a SoC design in accordance with an embodiment.

Turning next to FIG. 6, an embodiment of a SoC design in accordance with an embodiment is depicted. As a specific illustrative example, SoC 600 may be configured for insertion in any type of computing device, ranging from portable device to server system. Here, SoC 600 includes 2 cores 606 and 607. Cores 606 and 607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 606 and 607 are coupled to cache controller 608 that is associated with bus interface unit 609 and L2 cache 610 to communicate with other parts of system 600 via an interconnect 612. Applications in execution on cores 606, 607 may issue memory requests with a hint or other indication of a desired level of consistency. In turn, these requests may be converted into CXL.memory protocol consistent memory transactions as described herein.

Interconnect 612 provides communication channels to the other components, such as a Subscriber Identity Module (SIM) 630 to interface with a SIM card, a boot ROM 635 to hold boot code for execution by cores 606 and 607 to initialize and boot SoC 600, a SDRAM controller 640 to interface with external memory (e.g., DRAM 660), a flash controller 645 to interface with non-volatile memory (e.g., flash 665), a peripheral controller 650 (e.g., an eSPI interface) to interface with peripherals, video codec 620 and video interface 625 to display and receive input (e.g., touch enabled input), GPU 615 to perform graphics related computations, etc. In addition, the system illustrates peripherals for communication, such as a Bluetooth module 670, 3G modem 675, GPS 680, and WiFi 685. Also included in the system is a power controller 655. Further illustrated in FIG. 6, system 600 may additionally include interfaces including a MIPI interface 692, e.g., to a display and/or an HDMI interface 695 also which may couple to the same or a different display.

Figure 7:
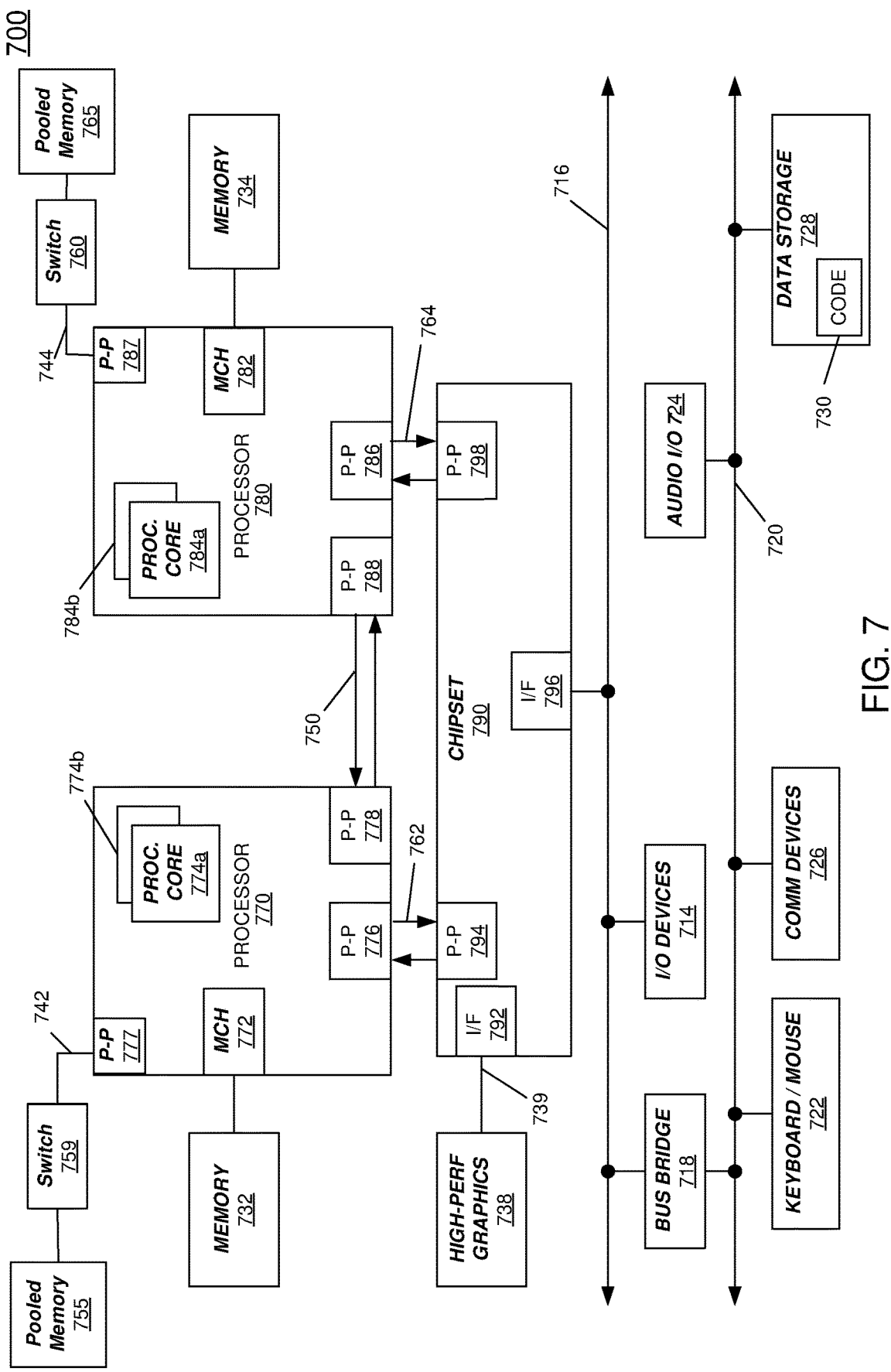
FIG. 7 is a block diagram of a system in accordance with another embodiment.

Referring now to FIG. 7, shown is a block diagram of a system in accordance with another embodiment such as an edge platform. As shown in FIG. 7, multiprocessor system 700 includes a first processor 770 and a second processor 780 coupled via a point-to-point interconnect 750. As shown in FIG. 7, each of processors 770 and 780 may be many core processors including representative first and second processor cores (i.e., processor cores 774a and 774b and processor cores 784a and 784b). Applications in execution on processors 770, 780 may issue memory requests with a desired level of consistency. In turn, these requests may be converted into CXL.memory protocol consistent memory transactions as described herein.

In the embodiment of FIG. 7, processors 770 and 780 further include point-to point interconnects 777 and 787, which couple via interconnects 742 and 744 (which may be CXL buses) to switches 759 and 760, which may handle consistent memory transactions as described herein. In turn, switches 759, 760 couple to pooled memories 755 and 765.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 776 and 786, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 524 may be coupled to second bus 720.

Figure 8:
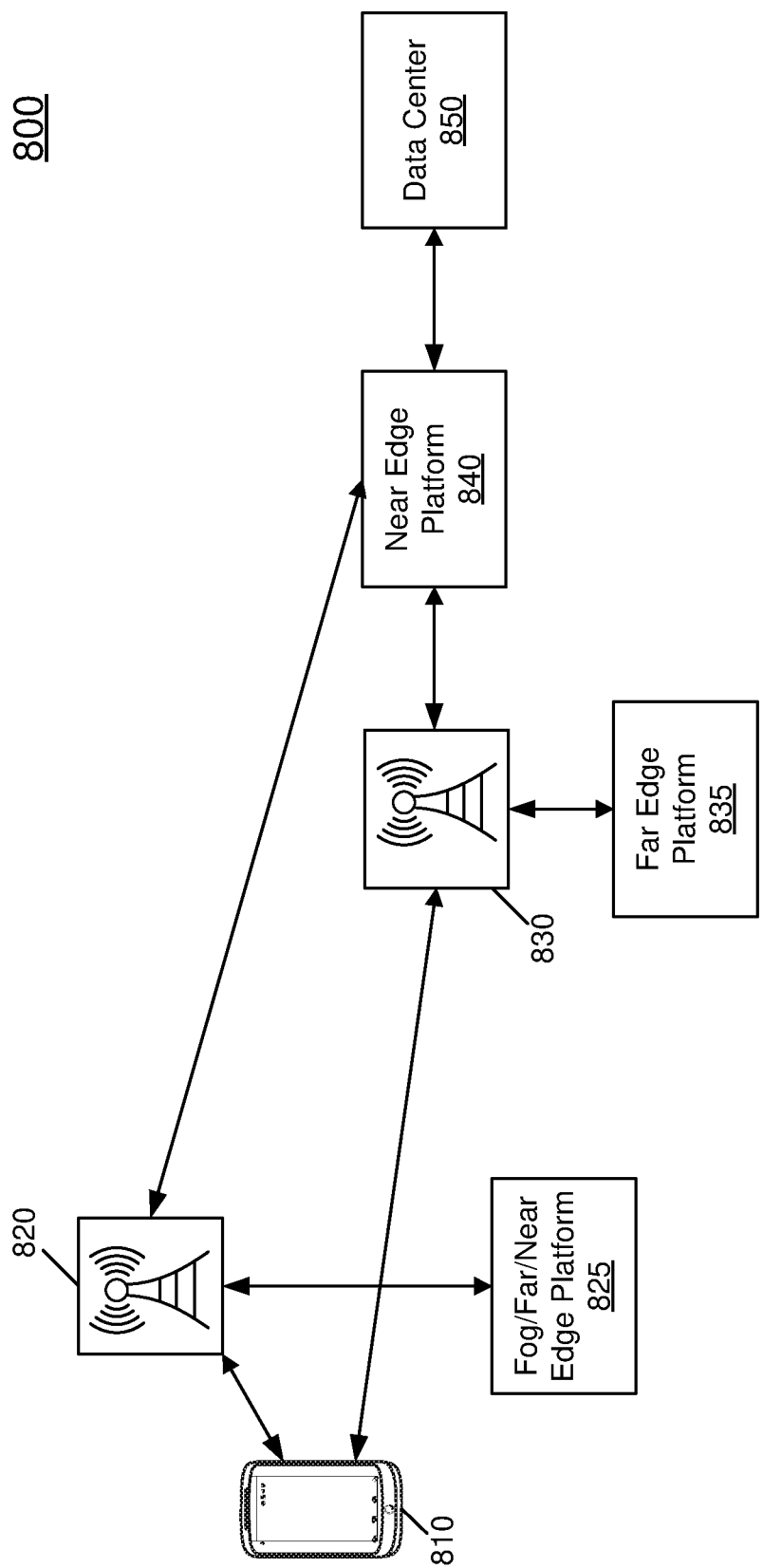
FIG. 8 is a block diagram of a network architecture in accordance with an embodiment.

Embodiments as described herein can be used in a wide variety of network architectures. To this end, many different types of computing platforms in a networked architecture that couples between a given edge device and a datacenter can issue and handle CXL-based consistent memory transactions as described herein. Referring now to FIG. 8, shown is a block diagram of a network architecture in accordance with another embodiment of the present invention. As shown in FIG. 8, network architecture 800 includes various computing platforms that may be located in a very wide area.

In the high level view of FIG. 8, network architecture 800 includes a representative device 810, such as a smartphone. This device may communicate via different radio access networks (RANs), including a RAN 820 and a RAN 830. RAN 820 in turn may couple to a platform 825, which may be an edge platform such as a fog/far/near edge platform, and which may leverage embodiments herein. Other requests may be handled by a far edge platform 835 coupled to RAN 830, which also may leverage embodiments.

As further illustrated in FIG. 8, another near edge platform 840 may couple to RANs 820, 830. Note that this near edge platform may be located closer to a data center 850, which may have a large amount of computing resources. By pushing messages to these more remote platforms, greater latency is incurred in handling requests on behalf of edge device 810. Understand that one more of the platforms shown in FIG. 8 may incorporate embodiments to perform CXL-based consistent memory transactions as described herein.

The following examples pertain to further embodiments.

In one example, an apparatus includes: an interface to couple a plurality of devices of a system, the system including a plurality of CPUs and at least one memory, the interface to enable communication according to a CXL protocol. The interface is to receive, from a first CPU of the plurality of CPUs, a consistent memory request having a type indicator to indicate a type of consistency to be applied to the consistent memory request. The apparatus may further include a request scheduler coupled to the interface to receive the consistent memory request and schedule the consistent memory request for execution according to the type of consistency, based at least in part on a priority of the consistent memory request and one or more pending consistent memory requests.

In an example, the request scheduler is to schedule the consistent memory request ahead of at least one of the one or more pending consistent memory requests based at least in part on the type of consistency of the consistent memory request.

In an example, the apparatus further comprises: a first storage having a plurality of entries, each of the plurality of entries to store, for a consistent memory request, an identifier for the consistent memory request, the priority of the consistent memory request, the type of the consistent memory request, and address information of the consistent memory request; and a second storage having a plurality of second entries, each of the plurality of second entries to store, for a memory request that conflicts with a consistent memory request, an identifier for the consistent memory request and address information of the conflicting memory request.

In an example, the request scheduler is to receive, after the consistent memory request, a first memory request that conflicts with the consistent memory request and store the first memory request in the second storage.

In an example, after the consistent memory request is completed, the request scheduler is to schedule the first memory request for execution.

In an example, the request scheduler is to schedule for execution one or more conflicting memory transactions that conflict with the consistent memory transaction, after the conflicting memory request is completed.

In an example, the request scheduler, when the type of consistency is a first consistency level, is to schedule the consistent memory request for execution after one or more non-consistent memory requests.

In an example, the interface is to receive the consistent memory request from a first platform, direct one or more cache coherency requests for a memory location of the consistent memory request to one or more remote platforms, and after receipt of cache coherency responses from the one or more remote platforms, the request scheduler is to schedule the consistent memory request for execution.

In an example, the apparatus comprises a CXL hub and the interface is to receive the consistent memory request according to a CXL.memory protocol.

In an example, the interface, after the consistent memory transaction is completed, is to send an acknowledgement to the first CPU, the acknowledgement comprising read data, where the read data is obtained from a remote platform coupled to the CXL hub.

In another example, a method includes: receiving, in a caching agent of a CPU, a memory request from an application in execution on the CPU; translating the memory request to a consistent memory request having a type indicator to indicate a type of consistency to be applied to the memory request; and sending the consistent memory request to a CXL hub coupled to the CPU via a CXL.memory protocol, to cause the CXL hub to schedule and direct the consistent memory request to a target memory.

In an example, the method further includes, when the memory request is a write request, invalidating one or more cache lines associated with an address of the write request.

In an example, the method further includes sending one or more cache coherency messages to a remote platform, to cause the remote platform to invalidate one or more cache lines in the remote platform associated with the address of the write request.

In an example, the method further includes sending the consistent memory request to the CXL hub after the one or more cache lines in the remote platform have been invalidated.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a first CPU having a first plurality of cores and a first CA; a second CPU coupled to the first CPU, the second CPU having a second plurality of cores and a second CA; and a CXL hub coupled to the first CPU and the second CPU, the CXL hub having a request scheduler. The request scheduler may: receive a consistent memory request from the first CPU according to a CXL.memory protocol; and schedule the consistent memory request for execution according to a type of consistency indicated in the consistent memory request, based at least in part on a priority associated with the consistent memory request and the type of consistency.

In an example, the CXL hub comprises: a first storage having a plurality of entries, each of the plurality of entries to store, for a consistent memory request, an identifier for the consistent memory request, the priority associated with the consistent memory request, the type of consistency, and address information of the consistent memory request; and a second storage having a plurality of second entries, each of the plurality of second entries to store, for a memory request that conflicts with a consistent memory request, an identifier for the consistent memory request and address information of the conflicting memory request.

In an example, the request scheduler is to receive, after the consistent memory request, a first memory request that conflicts with the consistent memory request and store the first memory request in the second storage.

In an example, after the consistent memory request is completed, the request scheduler is to schedule the first memory request for execution.

In an example, when the type of consistency is a first type of consistency, the request scheduler is to: store the consistent memory request in the first storage; schedule one or more other memory requests for execution; and thereafter schedule the consistent memory request for execution.

In an example, the first CA is to receive a memory write request from an application, and in response to the memory write request: invalidate one or more cache lines of a cache memory of the first CPU; send at least one invalidation message to one or more remote cache memories; receive an acknowledgement for the at least one invalidation message; and after receipt of the acknowledgement, send the consistent memory request to the CXL hub.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
an interface to couple a plurality of devices of a system, the system including a plurality of central processing units (CPUs) and at least one memory, the interface to enable communication according to a Compute Express Link (CXL) protocol, wherein the interface is to receive, from a first CPU of the plurality of CPUs, a consistent memory request having a type indicator to indicate a type of consistency to be applied to the consistent memory request; and
a request scheduler coupled to the interface to receive the consistent memory request and schedule the consistent memory request for execution according to the type of consistency, based at least in part on a priority of the consistent memory request and one or more pending consistent memory requests.

2. The apparatus of claim 1, wherein the request scheduler is to schedule the consistent memory request ahead of at least one of the one or more pending consistent memory requests based at least in part on the type of consistency of the consistent memory request.

3. The apparatus of claim 1, wherein the apparatus further comprises:

a first storage having a plurality of entries, each of the plurality of entries to store, for a consistent memory request, an identifier for the consistent memory request, the priority of the consistent memory request, the type of the consistent memory request, and address information of the consistent memory request; and a second storage having a plurality of second entries, each of the plurality of second entries to store, for a memory request that conflicts with a consistent memory request, an identifier for the consistent memory request and address information of the conflicting memory request.

4. The apparatus of claim 3, wherein the request scheduler is to receive, after the consistent memory request, a first memory request that conflicts with the consistent memory request and store the first memory request in the second storage.

5. The apparatus of claim 4, wherein after the consistent memory request is completed, the request scheduler is to schedule the first memory request for execution.

6. The apparatus of claim 3, wherein the request scheduler is to schedule for execution one or more conflicting memory transactions that conflict with the consistent memory transaction, after the conflicting memory request is completed.

7. The apparatus of claim 1, wherein the request scheduler, when the type of consistency is a first consistency level, is to schedule the consistent memory request for execution after one or more non-consistent memory requests.

8. The apparatus claim 1, wherein the interface is to receive the consistent memory request from a first platform, direct one or more cache coherency requests for a memory location of the consistent memory request to one or more remote platforms, and after receipt of cache coherency responses from the one or more remote platforms, the request scheduler is to schedule the consistent memory request for execution.

9. The apparatus of claim 1, wherein the apparatus comprises a CXL hub and the interface is to receive the consistent memory request according to a CXL.memory protocol.

10. The apparatus of claim 9, wherein the interface, after the consistent memory transaction is completed, is to send an acknowledgement to the first CPU, the acknowledgement comprising read data, wherein the read data is obtained from a remote platform coupled to the CXL hub.

11. At least one computer readable storage medium comprising instructions that when executed enable a system to:
receive, in a caching agent of a central processing unit (CPU), a memory request from an application in execution on the CPU;
translate the memory request to a consistent memory request having a type indicator to indicate a type of consistency to be applied to the memory request; and
send the consistent memory request to a Compute Express Link (CXL) hub coupled to the CPU via a CXL.memory protocol, to cause the CXL hub to schedule and direct the consistent memory request to a target memory.

12. The at least one computer readable storage medium of claim 11, further comprising instructions that when executed enable the system, when the memory request is a write request, to invalidate one or more cache lines associated with an address of the write request.

13. The at least one computer readable storage medium of claim 12, further comprising instructions that when executed enable the system to send one or more cache coherency messages to a remote platform, to cause the remote platform to invalidate one or more cache lines in the remote platform associated with the address of the write request.

14. The at least one computer readable storage medium of claim 13, further comprising instructions that when executed enable the system to send the consistent memory request to the CXL hub after the one or more cache lines in the remote platform have been invalidated.

15. A system comprising:
a first central processing unit (CPU) having a first plurality of cores and a first caching agent (CA);
a second CPU coupled to the first CPU, the second CPU having a second plurality of cores and a second caching agent (CA); and
a Compute Express Link (CXL) hub coupled to the first CPU and the second CPU, the CXL hub having a request scheduler, wherein the request scheduler is to:
receive a consistent memory request from the first CPU according to a CXL.memory protocol; and
schedule the consistent memory request for execution according to a type of consistency indicated in the consistent memory request, based at least in part on a priority associated with the consistent memory request and the type of consistency.

16. The system of claim 15, wherein the CXL hub comprises:
a first storage having a plurality of entries, each of the plurality of entries to store, for a consistent memory request, an identifier for the consistent memory request, the priority associated with the consistent memory request, the type of consistency, and address information of the consistent memory request; and
a second storage having a plurality of second entries, each of the plurality of second entries to store, for a memory request that conflicts with a consistent memory request, an identifier for the consistent memory request and address information of the conflicting memory request.

17. The system of claim 16, wherein the request scheduler is to receive, after the consistent memory request, a first memory request that conflicts with the consistent memory request and store the first memory request in the second storage.

18. The system of claim 17, wherein after the consistent memory request is completed, the request scheduler is to schedule the first memory request for execution.

19. The system of claim 16, wherein when the type of consistency is a first type of consistency, the request scheduler is to:
store the consistent memory request in the first storage;
schedule one or more other memory requests for execution; and
thereafter schedule the consistent memory request for execution.

20. The system of claim 15, wherein the first CA is to receive a memory write request from an application, and in response to the memory write request:
invalidate one or more cache lines of a cache memory of the first CPU;
send at least one invalidation message to one or more remote cache memories;
receive an acknowledgement for the at least one invalidation message; and
after receipt of the acknowledgement, send the consistent memory request to the CXL hub.

* * * * *